United States Patent [19]

Frey et al.

[11] Patent Number: 4,732,609

[45] Date of Patent: Mar. 22, 1988

[54] RECOVERY OF CYANIDE FROM WASTE WATERS BY AN ION EXCHANGE PROCESS

[75] Inventors: Carla C. Frey, Mississauga; W. Roland Hatch, Brampton; Margaret K. Witte, Mississauga, all of

[73] Assignee: Witteck Development Inc., Mississauga, Canada

[21] Appl. No.: 909,131

[22] Filed: Sep. 18, 1986

[30] Foreign Application Priority Data

Sep. 23, 1985 [CA] Canada ................................. 491323

[51] Int. Cl.$^4$ ............................................. B01D 15/00
[52] U.S. Cl. ...................................... 75/117; 75/105; 75/120; 75/121; 204/DIG. 13; 210/673; 210/684; 210/904; 423/24; 423/29; 423/100; 423/372
[58] Field of Search .................... 210/673, 684, 904; 204/DIG. 13; 75/105, 117, 120, 121; 423/24, 29, 100, 372

[56] References Cited

U.S. PATENT DOCUMENTS

| 2,962,351 | 11/1960 | Stevenson | 210/684 |
| 2,989,147 | 6/1961 | Gollmar | 210/904 |
| 3,656,893 | 4/1972 | Sloan | 210/904 |
| 3,788,983 | 1/1974 | Fries | 210/684 |
| 3,909,403 | 9/1975 | Abe et al. | 210/684 |
| 3,984,314 | 10/1976 | Fries | 423/684 |
| 4,250,030 | 2/1981 | Kuit et al. | 210/684 |
| 4,267,159 | 5/1981 | Crits | 423/24 |
| 4,440,644 | 4/1984 | Mudder et al. | 210/904 |
| 4,543,169 | 9/1985 | D'Agostino et al. | 210/684 |

FOREIGN PATENT DOCUMENTS

| 2219121 | 10/1974 | France | 210/904 |
| 3964 | 1/1975 | Japan | 210/904 |
| 35754 | 11/1975 | Japan | 210/904 |

*Primary Examiner*—John Doll
*Assistant Examiner*—Wayne A. Langel
*Attorney, Agent, or Firm*—Rogers, Bereskin & Parr

[57] ABSTRACT

A process is described for the substantially complete recovery of cyanide reagent and metal forming water soluble metal-cyanide complexes contained in mill effluents and waste waters. The process is comprised of a loading cycle wherein the metal-cyanide complexes are adsorbed onto a basic ion exchange resin and the free cyanide containing column effluent is returned to the mill. The metal ions, which are usually mostly copper, nickel and zinc, and the complexing cyanide are eluted in the subsequent regenerant cycle by an acid solution having controlled pH and controlled redox potential, the latter being measured against the saturated calomel electrode. The preferred oxidant to control the redox potential of the regenerant solution is hydrogen peroxide. The generated hydrogen cyanide is sparged with air, or removed by subatmospheric pressure from the regenerant solution, and dissolved in an alkaline scrubber solution for reuse. The metal ions are recovered from a bleed solution.

9 Claims, 2 Drawing Figures

FIGURE I - CYANIDE RECOVERY PROCESS

FIGURE I — CYANIDE RECOVERY PROCESS
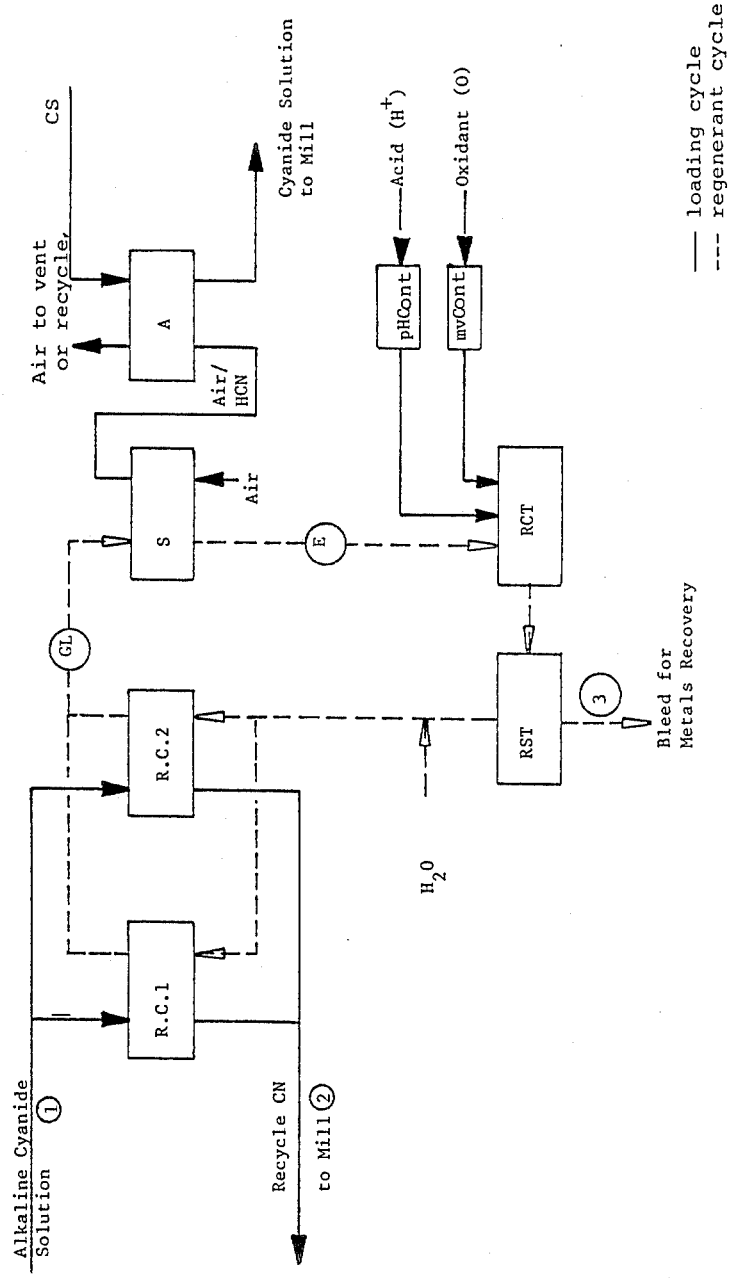

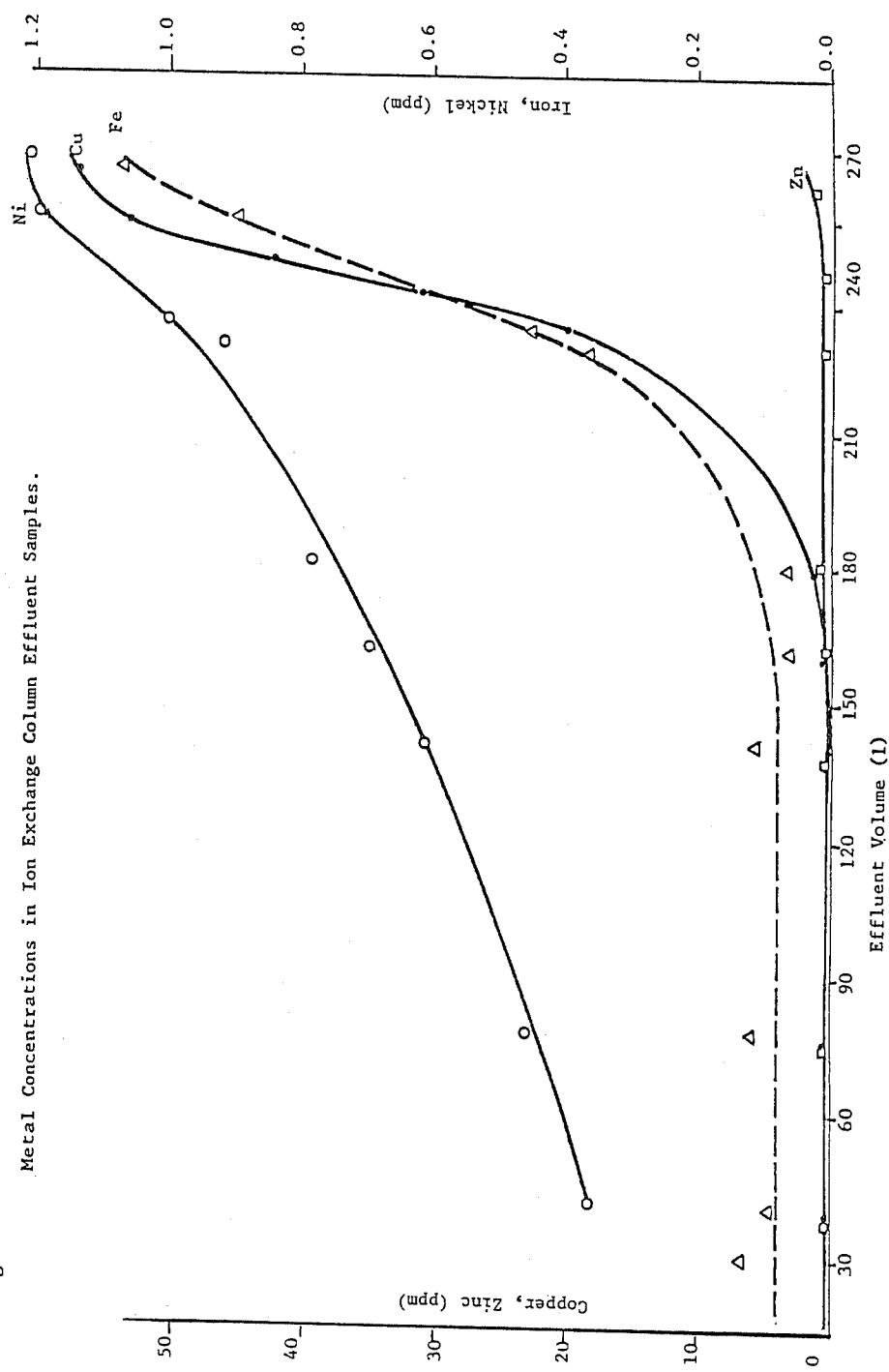
Figure 2   Metal Concentrations in Ion Exchange Column Effluent Samples.

RECOVERY OF CYANIDE FROM WASTE WATERS BY AN ION EXCHANGE PROCESS

This invention relates to the recovery of cyanide reagents for reuse, from waste solutions bearing soluble metal complexes. More particularly, the invention is directed to the recovery of cyanide from gold mill effluent solutions which contain a mixture of free cyanide and complex heavy metal cyanides.

Cyanide reagents are widely used by the mineral and mining industry in the recovery of gold and other precious metals by the utilization of various extractive processes. One of the greater difficulties, however, this industry is faced with is the elimination of the toxic cyanide ions from the effluents and waste waters of such extractive processes.

One of the avenues open to the mining industry is to destroy all the cyanide contained in the effluent and waste waters by using powerful oxidizing agents such as chlorine, ozone, hydrogen peroxide, to reduce the cyanide concentration to environmentally acceptable levels. This method, however, requires expensive reagents and the treatment of large volumes of liquid. The excess of oxidant may also damage the environment and the oxidation products may have additional detrimental effects as well. In another method, less powerful oxidizing agents are used such as sulphur dioxide or lower concentrations of oxidants but such methods use heavy metal catalysts as is described for example in U.S. Pat. No. 3,617,567, requiring the subsequent elimination of the heavy metal ions from the effluent.

Another method of eliminating cyanides from effluents and waste waters is the use of adsorbent liquid and/or solids for extracting the cyanide bearing compounds from the aqueous solution; and subsequently eluting and regenerating the cyanide reagents for reuse. The cyanide can be recycled to treat fresh ore and thus the cost of the operation can be substantially reduced. Most precious metal bearing ores also contain copper and nickel which will form soluble complexes with cyanide. Hence, the effluent from the precious metal recovery step usually contains free cyanide ions and copper and nickel cyanide complexes.

There are several processes in the prior art for the removal of copper and nickel cyanide complexes from effluents by ion exchange resins or liquids. Such a process is described in U.S. Pat. No. 3,056,648 (issued to Childers et al. on Oct. 2, 1962), utilizing a quaternary amine for recovering copper and cyanide from cuprocyanide bearing neutral brine solutions. This is a fairly complex operation having several columns and stripping steps and using expensive reagents.

A process by Fries, described in U.S. Pat. No. 3,788,983, issued on Jan. 29, 1974, adds ferrous ions to form a soluble ferro-cyanide complex with the cyanide present in the waste waters, which is subsequently removed by a weakly basic resin and eluted by an alkali hydroxide. The disadvantage of this process is that the cyanide ions form stable ferrocyanide anions and the conversion of such ions to alkali cyanide reagent for reuse is difficult and costly. Another process by Fries, U.S. Pat. No. 3,984,314, issued Oct. 5, 1976, teaches the removal of cyanide values from waste waters and effluents by forming copper cyanide complexes under mildly alkaline conditions adsorbing these complexes onto anionic and optionally cationic resins and subsequently regenerating the reagents by a strong acid. This method requires a special and costly resin and the reagent recovery is lengthy and incomplete.

Crits teaches a cyanide recovery process in U.S. Pat. No. 4,267,159, issued May 12, 1981, using a complex ion exchange resin bed and regeneration system. The teachings of this process are silent about the difficulties encountered in removing the precipitated heavy metal cyanide complexes from the resin bed, and the attendant diminishing efficacy of the adsorbent media.

A new process has been found wherein the heavy metal cyanide complexes which are present in a mill effluent solution are separated on a substrate and subsequently treated to recover both the metal ions and the cyanide reagent. The process thereby overcomes the shortcomings and the difficulties inherent in the prior art processes and it is also economical to operate. The recovered cyanide reagent, together with the unbound cyanide present in the mill effluent feed to the new process, are recycled to the mill or are otherwise reused, thereby avoiding the release of toxic substances to the environment.

The object of the invention is to regenerate the cyanide reagent bound as copper and similar soluble heavy metal complexes absorbed by an ion exchange resin, and return the regenerated cyanide and the free cyanide in the column effluent for reutilization to the mill.

The novel process for recovering cyanide reagents from mill effluent solutions containing alkali metal and alkali earth metal cyanides, and water soluble complexes metal cyanides comprises the steps of:

(a) passing the mill effluent solution containing free cyanide and complex metal cyanide ions through an anion exchange resin column to obtain a resin loaded with adsorbed complex metal cyanide ions and a free cyanide ion containing column effluent solution substantially depleted of complexed metal cyanide ions;

(b) recycling said free cyanide ion containing column effluent solution to the mill for reuse;

(c) treating said loaded resin with an oxidant bearing acidic solution to obtain a regenerated resin and an acidic cyanide and metal ion containing regenerant solution;

(d) recovering hydrogen cyanide and a metal from said regenerant solution obtained in step (c); and (e) returning the recovered hydrogen cyanide to the mill for reuse.

The invention will now be described in its preferred embodiment, supported further by working examples and by reference to the figures.

FIG. 1 shows a schematic flow diagram of the preferred embodiment of the process described herein.

FIG. 2 is a plot showing metal concentrations in effluent samples, taken at intervals from effluent passed through the ion exchange column.

DETAILED DESCRIPTION OF THE PROCESS

The treatment of gold and other precious metal bearing ores is carried out in conventional mills by the cyanidation leaching process. Gold is leached in an alkaline cyanide solution, forming a cyanide complex which is subsequently removed from solution by precipitation, cementation or carbon adsorption. Other metal cyanide complexes such as copper, iron, nickel and zinc, which may be present in the ore, are often formed during the leaching process. These report to the gold barren solution, along with excess free cyanide reagent initially added for leaching.

The discharge of toxic cyanide containing solutions presents severe environmental problems, and the present process is directed to the substantially complete recovery of the cyanide which form soluble metal cyanide complexes, for reuse in the mill. Moreover, the soluble metal complexes, if retained in the recycled solution, would diminish the efficiency of the reagent for extracting precious metals from fresh ore. The soluble metal-cyanide complexes are removed from the barren solution, according to the equation:

$$3R^+ + Cu(CN)_4^{3-} \rightarrow R_3Cu(CN)_4$$

wherein $R^+$ represents the ion exchange resin and the metal cyanide complex bears a cuprous ion.

The novelty of the present process lies in the application of controlled pH and redox potential in the regenerant solution when stripping copper and other complexed metals from the ion exchange resin.

Referring now to FIG. 1, the loading cycle is shown by solid lines. An alkaline cyanide gold barren mill effluent solution, (1) containing both free cyanide and complexed metal cyanides, is passed through an ion exchange resin column (RC1) containing an anion exchange resin which may be of the strong or weak base type. Strong base resins with a macroporous structure have been found most suitable for the application of this process. The resin is preferably operated in the sulphate form. Under these conditions, metal cyanide anionic complexes are adsorbed onto the resin while free cyanide ion passes through the column. The column effluent from column (2) is essentially at the same pH as the barren mill effluent feed solution and may be recycled to the mill. The cyanide in the solution devoid of interfering metal cyanide complexes, can thus be utilized in the leaching process.

The effluent from the column is monitored and when breakthrough of metal cyanide complexes occurs, the barren solution is diverted to a second column (RC2) of similar specification.

The steps of the regenerating column (RC2) are shown schematically in FIG. 1 by broken lines. Column (RC1) can be regenerated by similar steps.

Regeneration of the exhausted ion exchange resin column (RC2) is achieved by passing a dilute sulphuric acid solution upflow as shown, through the resin bed. The resin is fluidized and the metal cyanide complexes are stripped from the resin according to the following:

$$R_2-(M(CN)_4) + H_2SO_4 \rightarrow M(CN)_2 + 2HCN + R_2-SO_4$$

$$M(CN)_2 + H_2SO_4 \rightarrow 2HCN + MSO_4$$

where M is divalent metal forming a soluble cyanide complex.

The gas liquid mixture (GL) forming the regenerant solution from the column is passed downflow through a stripper column (S) or other device for contacting gas-liquid mixtures. Air is sparged countercurrent through the stripper to remove HCN gas, and carry it to the absorber (A) where the HCN gas is absorbed into a caustic scrubber solution (CS). The scrubber solution may be a separate sodium, potassium or calcium hydroxide solution, or conveniently the column effluent solution of the loading cycle.

The hydrogen cyanide free regenerant solution (E) from the stripper column (S) is transferred to a mixing vessel (RCT) where the pH is adjusted to the preferred level of 1.5 by the addition of mineral acid ($H^+$). Stripping, however, may be accomplished over a wide range of acidity, ranging from very acidic solutions (pH less than 1.0) to solutions having a pH of 5. Strongly acidic solutions improve the rate of metal ion desorption but result in excessive acid consumption. The preferred pH range of 1.0 to 4.0 results in efficient regeneration without excessive acid consumption. Sulphuric acid is the preferred regenerant acid due to its low cost and ability to directly convert the resin to the sulphate form.

An oxidant (O) is added to the regenerant solution to oxidize the metal ion of the metal cyanide complex adsorbed under controlled oxidation conditions. Most commonly the metal is copper, but zinc or other metals may also be present. The redox potential is maintained at a value where a large percentage of the copper is converted to cupric with a small amount of copper remaining as cuprous. Under these conditions an excess of oxidant is avoided and the resin is protected from oxidation-degradation by the oxidant added. The most convenient oxidant is a solution of hydrogen peroxide, but alkali peroxides such as $K_2O_2$ or $Na_2O_2$, or ozone may also be used. Solutions containing chlorates or hypochlorites may also be used under well controlled conditions.

A solution redox potential of between +350 and +550 mV as measured against a saturated calomel electrode (SCE), has been found to be the preferred range for redox potential control in the system.

The adjusted regenerant solution is then discharged to a regenerant holding tank (RST) from whence it is pumped to the ion exchange column (RC2). The recycle of regenerant solution is continued until complete removal of copper and other heavy metals is complete or for a time period known to produce complete regeneration.

It has been found that for best results the cupric-cuprous ratio in the regenerant solution should be greater than 20 to 1, or equivalent to having a redox potential of +500 mV (measured against SCE). The regenerant solution having adjusted pH and redox potential, is recycled to the column to elute additional copper cyanide. Such repeated regeneration of the column ensures copper cyanide elution in excess of 98%. The time required for complete regeneration is in the range of 3 to 8 hours; but this naturally, will depend on the concentrations of the metals present, the nature of the resin used, and on similar characteristics.

Following regeneration of the ion exchange column, the resin is washed with several bed volumes of water, which may be added to the regenerant solution. A portion of the solution is bled from the regenerant system either continuously or intermittently, for metal recovery, (3) and for maintaining a constant volume and metal ion concentration in the system. Metals may be recovered from the bleed stream (3) by electrowinning, precipitation or other means known to those skilled in the art.

The practice of this invention will be more clearly shown by considering the following examples.

EXAMPLE 1

An ion exchange loading test was carried out using a gold mill barren solution having the following composition:

Cu (40 ppm), Zn (31 ppm), Fe (1.0 ppm), Ni (12 ppm); free cyanide (350 ppm), pH=12.4.

The solution was passed through a resin column containing 500 ml. of Amberlite IRA-400 anion exchange resin in the sulphate form at a rate of 0.20 bed volumes/min. Effluent from the column was sampled periodically and analysed for heavy metals, free cyanide and pH. After 139 liters of solution had passed through the column, the effluent analysed had the following metal levels:

Cu (0.2 ppm), Zn (0.1 ppm), Fe (0.11 ppm), Ni (0.6 ppm), free cyanide (320 ppm), pH=12.3.

The analyses of the column effluent solution over the entire test period are shown in FIG. 2, indicating breakthrough with respect to copper and iron, occurring at approximately 200 liters. Total metal ion removal from the barren mill solution was greater than 95%, while more than 90% of the free cyanide passed through the column reporting to the column effluent for recycling to the mill.

EXAMPLE 2

A column stripping test was carried out using 25 ml. of Amberlite IRA-400 resin which had been previously loaded and contained the following concentrations of metals, given as mg metal/ml resin in brackets.

Cu (19.8), Zn (17.2), Ni (2.2), Fe (1.0).

Stripping was carried out at a regenerant flow rate of 0.07 bed volumes/min. using sulphuric acid solution with a pH of 1.2. No oxidant was added in this test.

The concentration of copper in the strip eluate rose to 48 mg/l in the 500 ml effluent sample. Samples taken after 4.0 liters of regenerant solution had passed through the column, were found to have a constant value of 45 mg/l copper. The redox potential of the effluent solution was found to be 300 mV which indicated a limiting solubility for copper desorbed from the column under these conditions.

The volume of regenerant solution required to completely strip the column of copper was in excess of 10 liters. Thus the volume was large, and the acidic solution was too dilute for economic recovery of both the metals and the cyanide reagent.

EXAMPLE 3

A similar column stripping test was carried out using 100 ml. of Amberlite IRA-400 which had previously been loaded and contained the following concentrations of metals, given as mg metal/ml resin:

Cu (22.0), Zn (12.0).

Stripping was carried out using 1.0 liter of dilute sulphuric acid solution (pH=1.0). Regenerant solution was passed upflow through the resin column fluidizing the resin bed. The effluent collected from the column was returned to the regenerant reservoir. Concentrated sulphuric acid and hydrogen peroxide (30% v/v) were added to the stirred regenerant tank to maintain the pH at 1.0, and the redox potential at 515 mV (SCE). Hydrogen cyanide gas from the resin column was drawn into a caustic scrubber using a mild vacuum.

After 3.2 hours the regenerant solution was sampled and found to contain greater than 95 percent of the copper and zinc originally adsorbed on the resin. The solution was concentrated in copper and zinc, having a concentration level of 2.16 g/l Cu and 1.11 g/l Zn.

EXAMPLE 4

A stripping test was carried out on a macroporous anion exchange resin Dowex MSA-1 which had previously been loaded, and had levels of 26.8 mgCu/ml resin and 17.1 mgZn/ml resin. A 100 ml. volume of resin was placed in a column and stripping was carried out using 500 ml of dilute (pH=1.5) sulphuric acid solution. Regenerant solution was pumped upflow through the resin bed. Hydrogen cyanide gas, evolved during stripping, was drawn into a caustic scrubber solution. The effluent was returned to the regenerant reservoir for adjustments. The temperature was maintained at 23° C. throughout the test. During the first four hours, only sulphuric acid was added to the regenerant reservoir to maintain the pH at 1.5. No oxidant was added and the redox potential of the solution measured 235 mV (SCE). The solution was analyzed and found to contain 150 mg/l copper, showing that only 2.8 percent of the copper having been removed from the resin.

After 4.0 hours, small additions of hydrogen peroxide (30% v/v) were made to the regenerant reservoir raising the redox potential to 480 mV (SCE) for a period of six hours. The resin was washed and analyzed. A complete mass balance on the test showed greater than 99.0 percent of the copper removed from the resin. The total amount of hydrogen peroxide added was 5.2 ml during the test. The final concentration of copper in solution was 5.0 g/l. Other heavy metals were completely stripped (>95%) and the metal sulphate solution was further treated for metals recovery. The hydrogen cyanide generated from the decomposed metal cyano-complexes was dissolved in the scrubber solution, and returned to leaching.

The present cyanide and metal recovery process has been described as applied to gold barren mill effluent solutions. With some modifications and variation the recovery process may be applied to other waste solutions, such as plating effluents, or similar cyanide and metalcyanide complex bearing solutions, without departing from the spirit and scope of the invention. Such modifications and variations are considered to be within the purview and scope of the invention and the appended claims.

The embodiments of the invention in which an exclusive property or privilege is claimed are defined as follows:

1. A process for recovering cyanide reagents from mill effluent solutions containing alkali metal and alkaline earth metal cyanides, and water soluble complex metal cyanides, comprising the steps of:
    (a) passing a mill effluent solution containing free cyanide and complexed metal cyanide ions through an anion exchange resin column to obtain a resin loaded with adsorbed complexed metal cyanide ions and a free cyanide ion containing column effluent solution substantially depleted of complexed metal cyanide ions;
    (b) recycling said free cyanide ion containing column effluent solution to the mill for reuse;
    (c) treating said loaded resin with an acidic solution bearing an oxidant selected from the group: hydrogen peroxide, ozone, water soluble metal peroxide compounds, water soluble hypochlorites, and water soluble chlorates, to obtain a regenerated resin and an acidic cyanide and metal ion containing regenerant solution;
    (d) recovering hydrogen cyanide and metal from said regenerant solution obtained in step(c); and
    (e) returning the recovered hydrogen cyanide to the mill for reuse.

2. A process for recovering cyanide reagents from mill effluent solutions containing alkali metal and alkaline earth metal cyanides, and water soluble complexed metal cyanide ions, comprising the steps of:
  (a) passing a mill effluent solution containing free cyanide and complexed metal cyanide ions through an anion exchange resin column to obtain a resin loaded with adsorbed complexed metal cyanide ions and a free cyanide ion containing column effluent solution substantially depleted of complexed metal cyanide ions;
  (b) recycling said free cyanide ion containing column effluent solution to the mill for reuse;
  (c) treating said loaded resin with an acidic solution bearing an oxidant selected from the group: hydrogen peroxide, ozone, water soluble metal peroxide compounds, water soluble hypochlorites, and water soluble chlorates, to obtain a partially regenerated resin and an acidic cyanide and metal ion containing solution;
  (d) recovering hydrogen cyanide from said acidic solution obtained in step (c);
  (e) adjusting the acidity and the redox potential of the solution depleted of hydrogen cyanide in step (d) and returning said solution to said partially regenerated resin until substantially all the adsorbed complexed metal cyanide ions have been removed from said resin to yield a fully regenerated resin and an acidic regenerant solution containing hydrogen cyanide and metal ions;
  (f) recycling the recovered hydrogen cyanide to the mill for reuse and recovering metal ions from said acidic regenerant solution.

3. A process according to claim 1 or 2, wherein the metal ion in the complexed metal cyanide is copper ion.

4. A process according to claim 1 or 2, wherein the metal ion in the complexed metal cyanide is zinc ion.

5. A process according to claim 1 or 2 wherein the pH of the acidic resin treating solution is adjusted to be between 1.0 and 4.0 by addition of a mineral acid.

6. A process according to claim 1 or 2, wherein the pH of the acidic resin treating solution is adjusted to be between 1.0 and 4.0 by additions of sulphuric acid.

7. A process according to claim 1 or 2, wherein the redox potential of the resin treating solution is adjusted to be in the range of +350 to +550 millivolts measured against the standard calomel electrode (SCE), by addition of a reagent selected from the group: hydrogen peroxide, ozone and alkali metal peroxide.

8. A process according to claim 1 or 2, wherein the hydrogen cyanide contained in said regenerant solution in step (c) is recovered by air sparging.

9. A process according to claim 1 or 2, wherein the hydrogen cyanide contained in said regenerant solution in step (c) is recovered by the application of subatmospheric pressure.

* * * * *